(12) United States Patent
Petersen (10) Patent No.: US 7,598,649 B2
(45) Date of Patent: Oct. 6, 2009

(54) VERTICAL STATOR DOUBLE GAS D.C. PM MOTORS

(75) Inventor: Christian C. Petersen, Pocasset, MA (US)

(73) Assignee: Petersen Technology Corporation, Bourne, MA (US)

( * ) Notice: Subject to any disclaimer, the term of this patent is extended or adjusted under 35 U.S.C. 154(b) by 542 days.

(21) Appl. No.: 11/397,757

(22) Filed: Apr. 4, 2006

(65) Prior Publication Data

US 2006/0244338 A1 Nov. 2, 2006

Related U.S. Application Data

(60) Provisional application No. 60/676,235, filed on Apr. 29, 2005.

(51) Int. Cl.
*H02K 1/00* (2006.01)

(52) U.S. Cl. ...................................................... 310/216

(58) Field of Classification Search ................. 310/216, 310/266, 112
See application file for complete search history.

(56) References Cited

U.S. PATENT DOCUMENTS

| | | | | |
|---|---|---|---|---|
| 5,783,893 | A * | 7/1998 | Dade et al. ................... | 310/266 |
| 6,037,696 | A * | 3/2000 | Sromin et al. ............... | 310/268 |
| 6,590,312 | B1 * | 7/2003 | Seguchi et al. .............. | 310/266 |
| 2004/0041482 | A1 * | 3/2004 | Petersen ................ | 310/154.01 |

* cited by examiner

*Primary Examiner*—Nguyen N Hanh
(74) *Attorney, Agent, or Firm*—Mueller Smith & Okuley, LLC (57) ABSTRACT

A vertical stator d.c. PM motor employs outer and inner working air gaps wherein the length of the inner working gap at any stator pole is greater than the corresponding length at the outer working gap. A mutual cancellation of detent torque between the outer and inner working gaps is promoted through an offsetting of the rotor magnetic regions.

8 Claims, 7 Drawing Sheets

VERTICAL STATOR DOUBLE GAS D.C. PM MOTORS

CROSS-REFERENCE TO RELATED APPLICATIONS

This application claims the benefit of provisional Application Ser. No. 60/676,235, filed on Apr. 29, 2005, entitled, "Vertical Stator Double Gap D.C. PM Motor", the disclosure of which is hereby expressly incorporated by reference.

STATEMENT REGARDING FEDERALLY SPONSORED RESEARCH

Not applicable.

BACKGROUND OF THE INVENTION

Investigators in the electric motor arts have been called upon to significantly expand motor technology from its somewhat static status of many decades. Improved motor performance particularly has been called for in such technical venues as computer design and secondary motorized systems carried by vehicles, for example, in the automotive and aircraft fields. With progress in these fields, classically designed electric motors, for example, utilizing brush-based commutation, while relatively inexpensive, have been found to be unacceptable or, at best, marginal performers.

From the time of its early formation, the computer industry has employed brushless d.c. motors for its magnetic memory systems. The electric motors initially utilized for these drives were relatively expensive and incorporated a variety of refinements, for instance as necessitated with the introduction of rotating disc memory. Over the recent past, the computer industry has called for very low profile motors capable of performing in conjunction with very small disc systems and at substantially elevated speeds.

Petersen, in U.S. Pat. No. 4,745,345 entitled "D.C. Motor with Axially Disposed Working Flux Gap", issued May 17, 1988, describes a PM d.c. motor of a brushless variety employing a rotor-stator pole architecture wherein the working flux gap is disposed "axially" with the transfer of flux being in parallel with the axis of rotation of the motor. This "axial" architecture further employs the use of field windings which are simply structured, being supported from stator pole core members, which, in turn, are mounted upon a magnetically permeable base. The windings positioned over the stator pole core members advantageously may be developed upon simple bobbins insertable over the upstanding pole core members. Such axial type motors have exhibited excellent dynamic performance and efficiency and, ideally, may be designed to assume very small and desirably variable configurations.

Petersen in U.S. Pat. No. 4,949,000, entitled "D.C. Motor", issued Aug. 14, 1990 describes a d.c. motor for computer applications with an axial magnetic architecture wherein the axial forces which are induced by the permanent magnet based rotor are substantially eliminated through the employment of axially polarized rotor magnets in a shear form of flux transfer relationship with the core components of the stator poles. The dynamic tangentially directed vector force output (torque) of the resultant motor is highly regular or smooth lending such motor designs to numerous high level technological applications such as computer disc drives which require both design flexibility, volumetric efficiency, low audible noise, and a very smooth torque output.

Petersen et al, in U.S. Pat. No. 4,837,474 entitled "D.C. Motor", issued Jun. 6, 1989, describes a brushless PM d.c. motor in which the permanent magnets thereof are provided as arcuate segments which rotate about a circular locus of core component defining pole assemblies. The paired permanent magnets are magnetized in a radial polar sense and interact without backiron in radial fashion with three core components of each pole assembly which include a centrally disposed core component extending within a channel between the magnet pairs and two adjacently inwardly and outwardly disposed core components also interacting with the permanent magnet radially disposed surface. With the arrangement, localized rotor balancing is achieved and, additionally, discrete or localized magnetic circuits are developed with respect to the association of each permanent magnet pair with the pole assembly.

Petersen in U.S. Pat. No. 5,659,217, issued Aug. 19, 1997 and entitled "Permanent Magnet D.C. Motor Having Radially-Disposed Working Flux-Gap" describes a PM d.c. brushless motor which is producible for incorporation into products intended for the consumer marketplace. These motors exhibit a highly desirable heat dissipation characteristic and provide improved torque output in consequence of a relatively high ratio of the radius from the motor axis to its working gap with respect to the corresponding radius to the motors' outer periphery. The torque performance is achieved with the design even though lower cost, or, lower energy product permanent magnets may be employed with the motors. See also: Petersen, U.S. Pat. No. 5,874,796, issued Feb. 23, 1999.

The above-discussed PM d.c. motors achieve their quite efficient and desirable performance in conjunction with a multiphase-based rotational control. This term "multiphase" is intended to mean at least three phases in conjunction with either a unipolar or bipolar stator coil excitation. Identification of these phases in conjunction with rotor position to derive a necessary controlling sequence of phase transitions traditionally has been carried out with two or more rotor position sensors in discretely different positions. Particularly where low cost small motors are involved, the utilization of mutually spaced multiple sensors adds a considerable cost factor inasmuch as a utilization of practical integrated circuit packaging to include the sensors is precluded.

Petersen, in application for U.S. patent Ser. No. 10/706, 412, filed Nov. 12, 2003 entitled "Multiphase Motors With Single Point Sensing Based Commutation" describes a simplified method and system for control of multiphase motors wherein a single sensor is employed with an associated sensible system to establish reliable and more cost effective phase commutation sequencing.

Over the years of development of what may be referred to as the Petersen motor technology, improved motor design flexibility has been realized. Designers of a broad variety of motor driven products including household implements and appliances, tools, pumps, fans and the like as well as more precise systems such as disc drives now are afforded an expanded configuration flexibility utilizing the new motor systems. No longer are such designers limited to the essentially "off-the-shelf" motor varieties as listed in the catalogues of motor manufacturers. Now, motor designs may become components of and compliment the product itself in an expanded systems design approach.

During the recent past, considerable interest has been manifested by motor designers in the utilization of magnetically "soft" processed ferromagnetic particles in conjunction with pressed powder technology as a substitute for the conventional laminar steel core components of motors. So structured, when utilized as a stator core component, the product can exhibit very low eddy current loss which represents a highly desirable feature, particularly as higher motor speeds and resultant core switching speeds are called for. As a further advantage, for example, in the control of cost, the pressed powder assemblies may be net shaped wherein many intermediate manufacturing steps and quality considerations are avoided. Also, tooling costs associated with this pressed powder fabrication are substantially lower as compared with the corresponding tooling required for typical laminated steel fabrication. The desirable net shaping pressing approach provides a resultant magnetic particle structure that is 3-dimensional magnetically (isotropic) and avoids the difficulties encountered in the somewhat two-dimensional magnetic structure world of laminations. See generally, U.S. Pat. No. 5,874,796 (supra).

The high promise of pressed powder components for motors and generators (electrodynamic apparatus) initially was considered compromised by a characteristic of the material wherein it exhibits relatively low permeability. However, Petersen, in U.S. Pat. No. 6,441,530, issued Aug. 27, 2002 entitled "D.C. PM Motor With A Stator Core Assembly Formed Of Pressure Shaped Processed Ferromagnetic Particles", describes an improved architecture for pressed powder formed stators which accommodates for the above-noted lower permeability characteristics by maximizing field coupling efficiencies.

Motor and generator technology has been advanced with respect to architectures exhibiting what has become to be known as "vertical stator" devices. As described in U.S. Pat. No. 6,617,747 by Petersen, entitled "PM Motor and Generator With a Vertical Stator Core Assembly Formed of Pressure Shaped Processed Ferromagnetic Materials", issued Sep. 9, 2003 this architecture combines a radially directed magnetic flux transference at a working gap with a pressed powder-based stator structure wherein the stator poles are parallel with the device axis. Improvements in performance and expanded design latitudes are observed.

A double gap version of the motor described in U.S. Pat. No. 6,617,747 is described in Petersen U.S. Pat. No. 6,707,224 issued Mar. 16, 2004.

As the development of pressed powder stator structures for electrodynamic devices such as motors and generators has progressed, investigators have undertaken the design of larger, higher power systems. This necessarily has lead to a concomitant call for larger press molded configurations. The associated pressing process requires significant pressing pressures in order to evolve requite material densities to gain adequate electrical properties. To achieve those densities, press molding is needed in the 40 tons per square inch to 50 tons per square inch range. As a consequence, the powder metal pressing industry requires that the molded parts exhibit aspect ratios (width or thickness to length in the direction of pressing) equal to or less than about 1:5 to maintain uniformity throughout the part. Thus as the lengths of stator core component structures increase, their thickness must increase to an extent that a resultant shape becomes so enlarged in widthwise cross section as to defeat important motor design goals, with attendant loss of both the economies of cost and enhanced performance associated with the emerging pressed powder technology.

Petersen, in application for U.S. patent Ser. No. 10/747,538 filed Dec. 29, 2003 entitled "Electrodynamic Apparatus and Method of Manufacture", describes apparatus and manufacturing method for producing larger stator structures with pressed powder technologies. While retaining practical shapes and desirable dimensional characteristics, the stator structures are formed to exhibit requisite stator core particle densities. These advantageous aspects are achieved through the utilization of a modular approach to stator core formation.

Production costs for electronically commutated multi-phased motors can further be minimized by controlling the cost of involved electronic components, in particular, by limiting their number. For instance, the number of power devices or switching components required for multi-phased motors is minimized where a unipolar or single sided drive topology is employed. With typical unipolar configurations, the field windings of a given phase are energized in a singular polar sense, i.e., a north polar sense or a south polar sense. Thus, only one power device is required for each phase of the commutational scheme. However, at the point of commutation from one phase to a next in a commutational sequence, the energy necessarily stored in the phase being released must be accommodated for. Collapsing field induced back EMF or flyback voltage spikes encountered will exhibit amplitudes which are 20 times to 30 times that of the supply input to these unipolar configurations. Particularly as mechanical motor power is increased this calls for cost effective methods for removing the negative effects of the flyback voltage spikes. Heretofore, avoidance of those cost constraints has only been achieved through the utilization of unipolar systems with quite low power motor applications as may be evidenced with fans for computer applications.

In contrast to a unipolar structure approach, bipolar topology involves the excitation of field windings between one polar sense and an opposite polar sense. In terms of performance, the bipolar approach exhibits many advantageous aspects. For example, 3-phase unipolar systems are commutated at a theoretical 50% of maximum torque level, and, in effect, make use of one third of the total field winding array to achieve rotational drive. In comparison, considerably more expensive bipolar systems with twice the number of power switching devices commutate theoretically at 86% of maximum torque level and, in effect, utilize two thirds of the field winding assemblage to achieve a comparatively higher level of performance. Additionally, the bipolar architecture controls the flyback energy present in a collapsing field.

Notwithstanding these enhanced performance aspects associated with bipolar phase excitation design, the marketplace for electric motors is cost driven. Should practical electronic commutation approaches be achieved for higher power multiphase single sided systems, for example, in the 100 watt to 200 watt and above mechanical drive power range, the many advantageous performance and design flexibility aspects of brushless motor technology, albeit with unipolar based performance, will be made available to commerce at costs competitive with dated d.c. brush, universal and a.c. induction motor technologies.

Bringing the cost of unipolar multiphase motors to competitive and practical levels with the ubiquitous brush commutated motors, calls for corrective innovation with respect to three basic aspects, to wit: (a) overcoming the high costs associated with the use of multiple sensors in the commutation scheme; (b) making effective use of and practically forming pressed powder stator structures; and (c) providing a commutation system of competitive cost which practically and efficiently treats collapsing field back EMF or flyback phenomena. Thus, a trilogy of innovations are necessitated to bring the highly desirable features of multi-phase unipolar motor architecture into esse. One palliative component of that trilogy addressed to aspect (a) is the single sensor based commutation system described in application for U.S. patent Ser. No. 10/706,412 (supra), The second solutional component of that trilogy addressed to aspect (b) is the improved pressure shaped processed ferromagnetic particle stator technology described in U.S. Pat. Nos. 6,441,530; 6,617,747; and 6,707,224 (supra) and the modular approach to stator core formation described in application for U.S. patent Ser. No. 10/747,538 (supra). The third solutional component of that trilogy addressed to aspect (c) is achieved with a practical treatment of collapsing field energy with a winding topology wherein each stator pole is wound with a primary winding as well as an inductively associated secondary winding for a given phase. The result is a substantial decrease in both the amplitude and the duration of the back EMF spike to an extent diminishing energy to levels readily managed by the power switching devices. The approach generally is referred to as a "bi-phase unipolar drive" or "BUD" and is described by Petersen in Provisional Application No. 60/610,155 filed Sep. 15, 2004.

With the components of practicality now being realized, investigators now look to evolving electrodynamic systems of greater efficiency and smooth or regular operational characteristics.

BRIEF SUMMARY OF THE INVENTION

The present invention is addressed to a d.c. PM motor architecture utilizing a stator core formed of pressure shaped processed soft ferromagnetic particles which are mutually insulatively associated. This isotropic material is efficiently employed for motors of higher power through the employment of a double working gap configuration in conjunction with a vertical stator format. With this arrangement, each stator pole presents an outer flux interaction surface and an oppositely disposed inner flux interaction surface to the respective outer and inner confronting magnetic surfaces of two ring-shaped rotor magnets to establish outer and inner working gaps at each stator pole. To promote a force parity at these working gaps, the length extending parallel to the motor axis of the inner flux interacting surface is made greater than the corresponding length of the outer flux interacting surface.

The larger power motors often employ more powerful rare earth rotor magnets in combination with larger radii extending from the motor axis to the two working gaps. As a consequence, quite significant mechanical detent or cogging torques are present. Each of the two rotor magnets of the double gap (DG) motor are formed with a radial boundary defined sequence of regions of magnetization of alternating polarity. Such alternating polarity junctions can be defined by boundary lines, an approach utilized in the drawings. The radially adjacent corresponding outer radial boundary defined regions of magnetization and inner radial boundary defined regions of magnetization exhibit a common magnetic polarity, i.e., as a radially magnetized ring. To promote a mutual cancellation of the outer and inner detent torques, the inner and outer radial magnetic boundaries are offset. In this regard, typically there are six mechanical detent cycles for each energized torque cycle. Thus, the electrical torque travel may be offset to establish a 180° mechanical detent torque offsetting between the inner and outer working gaps. The double working gap (DG) typography is highly suited for this form of detent torque minimization.

Other objects of the invention will, in part, be obvious and will, in part, appear hereinafter. The invention, accordingly, comprises the apparatus possessing the construction combination of elements and arrangement of parts which are exemplified in the following detailed description.

For a fuller understanding of the nature and objects of the invention, reference should be made to the following detailed description taken in connection with the accompanying drawings.

DETAILED DESCRIPTION OF THE INVENTION

In the discourse to follow, the architecture of a larger power motor, for instance, one-half horsepower is illustrated and described, following which the architecture of a smaller power motor suited, for example, for appliances, tools and the automotive field is described. In each instance, motor architectures are ones featuring two spaced apart working gaps sometimes referred to as "double gap" (DG). These working gaps perform in conjunction with a vertical stator format having stator cores with oppositely disposed inner and outer flux interaction surfaces. Stator cores are formed utilizing a pressure shaped process of soft ferromagnetic particle structure, the particles of which are mutually insulatively associated. The material is sold under the trade designation "Somaloy®", a product manufactured by Höganäs AB of Sweden.

Figure 1:
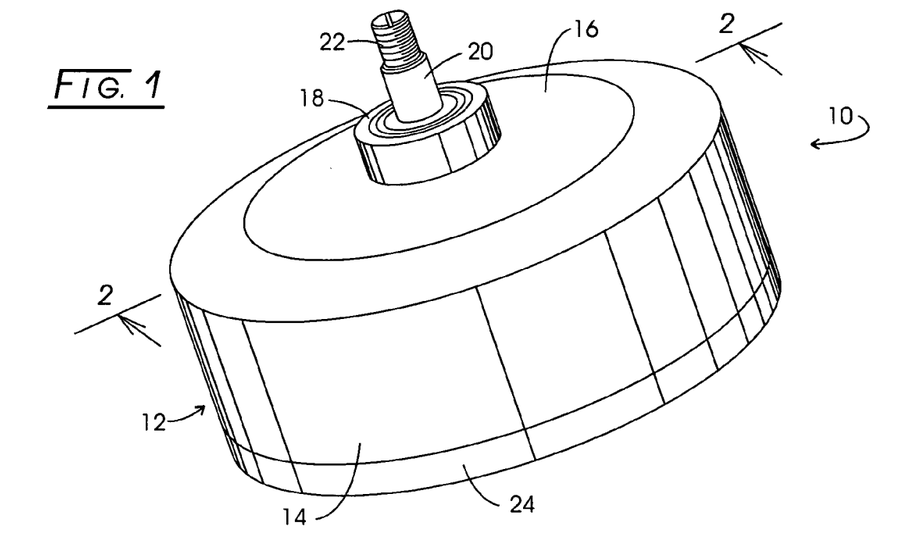
FIG. 1 is a perspective view of a motor employing the architecture of the invention.

Referring to FIG. 1, a relatively larger power d.c. PM motor of a DG variety is represented in general at 10. Motor 10 is configured with an outer polymeric cap represented generally at 12 which is formed having a cylindrical sidewall 14, and a cap top portion 16 which, in turn, supports a centrally disposed cylindrical seal cavity 18. Extending outwardly from the seal cavity 18 is an output shaft extension 20 having a threaded connector component 22 extending therefrom. Outer cap 12 is threadably attached to aluminum base 24 and is sealed thereto.

Figure 2:
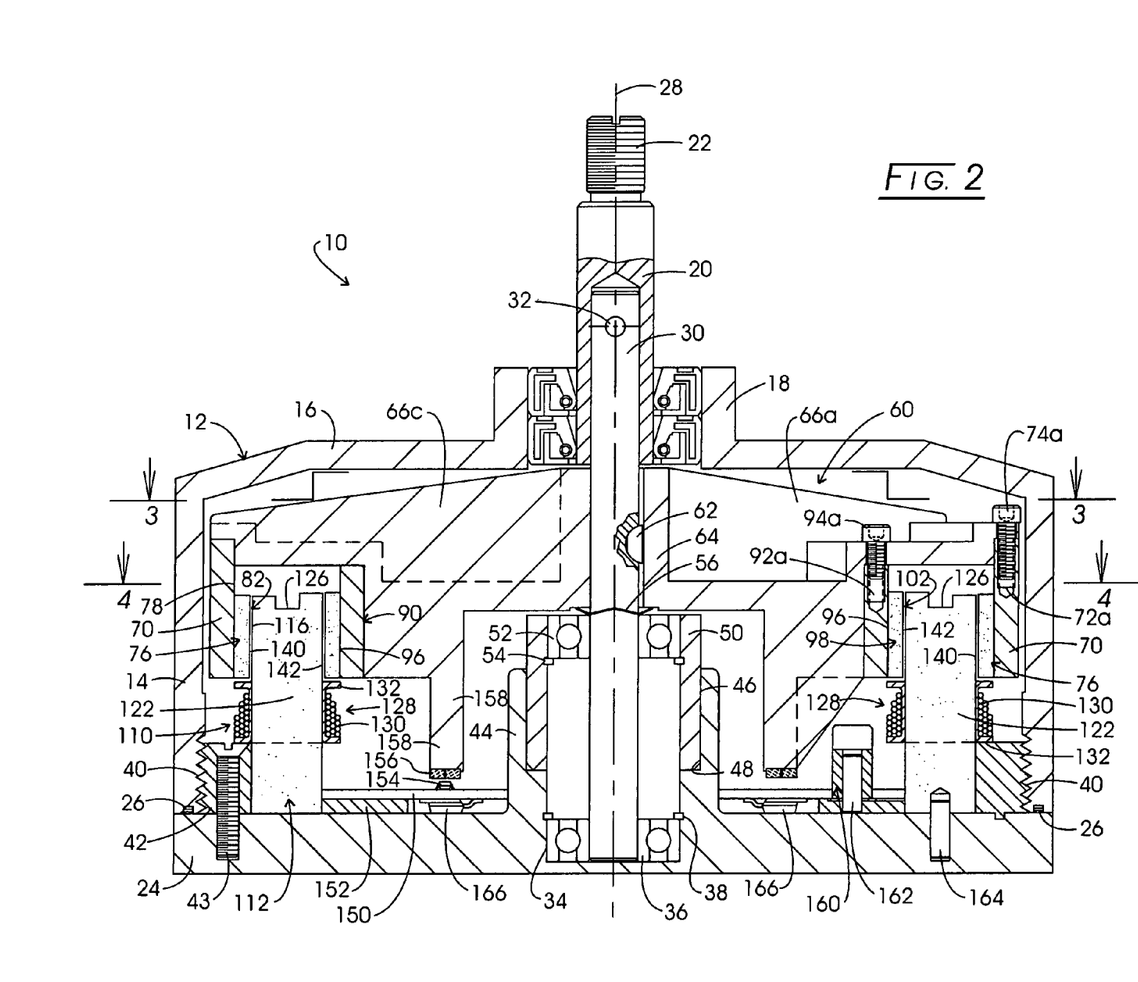
FIG. 2 is a sectional view taken through the plane 2-2 shown in FIG. 1.

Looking to FIG. 2, an O-ring seal is shown at 26. The shaft extension 22 is seen to be rotatable about a motor axis 28 and that extension 20 is shown fixed to motor shaft 30 by a pin arrangement represented at 32. To rotatably support the shaft 30, base 24 is centrally configured with a bearing housing cavity 34 symmetrically disposed about axis 28 and nestably retaining a bearing 36. Bearing 36 is retained in its lower position by a snap ring member 38.

Integrally formed with and extending upwardly from base 24 is a generally cylindrically shaped bearing support 44 which is disposed symmetrically about axis 28 and is bored to provide a cylindrical sleeve support surface 46 extending downwardly to a ledge support 48 fashioned within support 44. Surface 46 and ledge 48 support a cylindrical aluminum sleeve 50 which in turn, supports an upper bearing 52. Bearing 52 is retained in position by a snap ring 54 and wavy washer 56. Cap 12 is coupled with base 24 at a threaded connection 40. An externally threaded aluminum ring 42 coupled to base 24 by machine screws as at 43 establishes this connection.

Shaft 30 is supported for driven rotation about motor axis 28 and is connected to a rotor represented generally at 60. In this regard, connection between the shaft 30 and rotor 60 is at a Woodruff connector 62. Looking additionally to FIG. 3, the principally polymeric rotor 60 is seen to be a somewhat elaborate component. Centrally, it is configured with a cylindrical shaft engagement portion 64 which is operationally associated with Woodruff connector 62 so as to be able to impart rotational drive to shaft 30. The upper portion of the rotor 60 is configured with five polymeric radial supports or struts 66a-66e.

Figure 3:
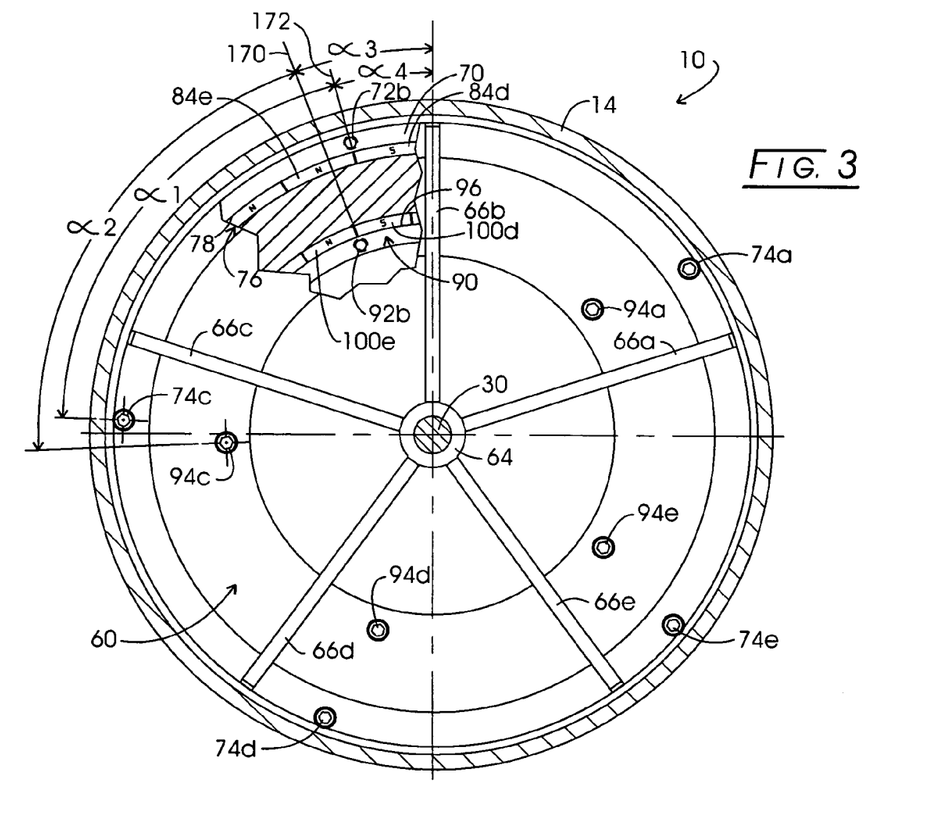
FIG. 3 is a sectional view taken through the plane 3-3 shown in FIG. 2.
Figure 4:
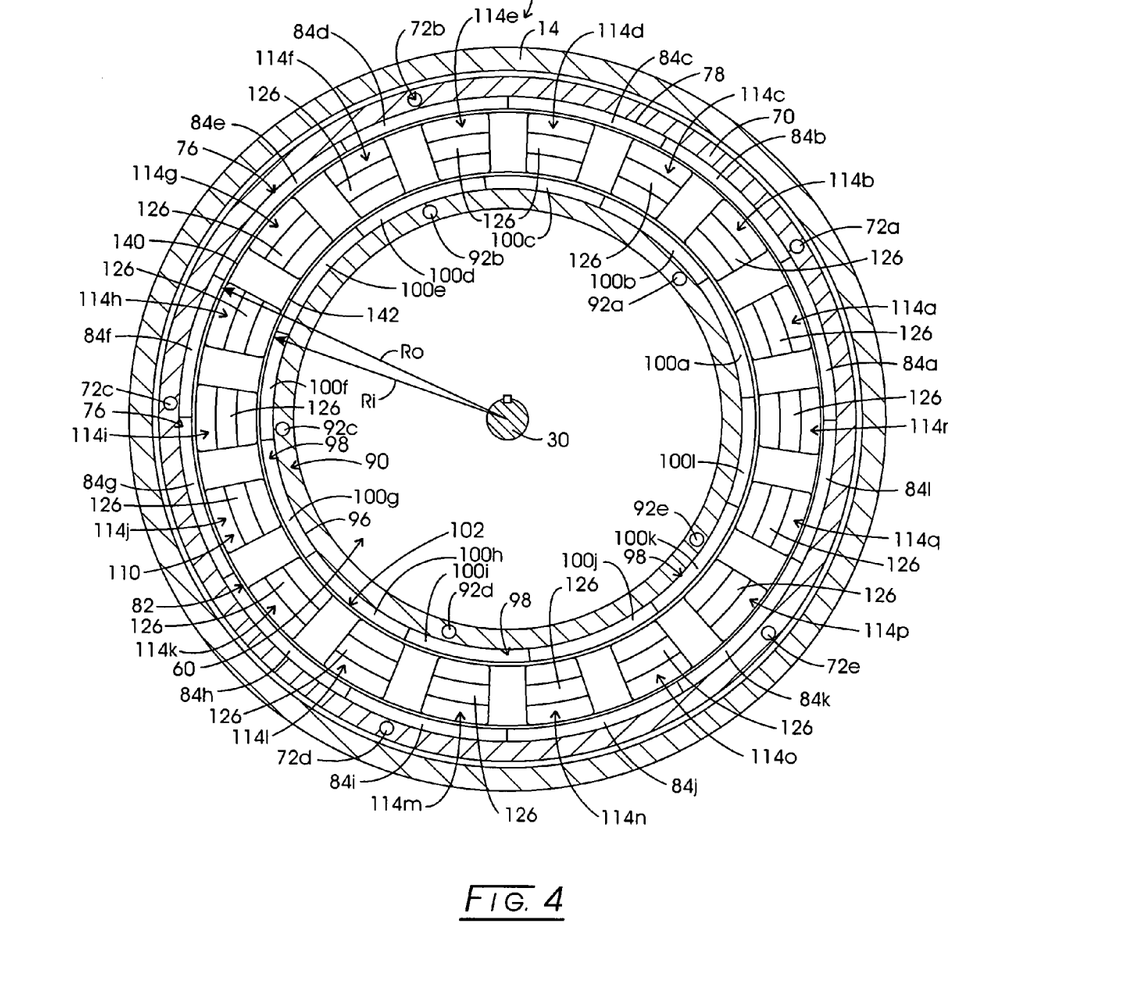
FIG. 4 is a sectional view taken through the plane 4-4 shown in FIG. 2.

Referring additionally to FIG. 4, the radially outward end or tip or rotor 60 supports a magnetically permeable metal backiron ring 70. Ring 70 is secured to the rotor 60 by five machine screws threadably engaged within threaded bores extending from the top of ring 70. In FIG. 4, those threaded bores are identified at 72a-72e. The machine screws associated with these bores 72a-72e are respectively represented in FIG. 3 at 74a and 74c-74e. FIG. 3 additionally reveals that these machine screws and associated bores are spaced apart an angle α1, which for one embodiment is 72°. That encompassing arc is represented in FIG. 3.

As seen in FIGS. 2-4, a ring-shaped rare earth magnet represented generally at 76 is bonded to the cylindrical inner surface 78 of backiron 70. Ring magnet 76 is configured with twelve generally arcuate outer radial boundary defined regions of magnetization of alternating polarity and may be provided, for instance, as a bonded neodyminium-iron-boron material. Such boundaries are shown as lines. Outer rotor magnet 76 is configured with an outer confronting surface represented generally at 82 which inwardly presents the noted radial boundary defined regions of magnetization of alternating polarity represented in FIG. 4 at 84a-84l.

Rotor 60 also supports a ring-shaped inner backiron represented generally at 90. In this regard, FIG. 4 reveals a sequence of five threaded bores 92a-92e. Connection with rotor 60 is by machine screws, four of which are revealed in FIG. 3 at 94a and 94c-94e. In the figure, it may be noted that machine screws as at 94a and 94c-94e are radially angularly spaced apart by an arc α2, which may be 72° or the same angular spacing as arc angle α1. The figure further reveals that these arcs are slightly angularly displaced. The outward surface of ring-shaped inner backiron 90 as at 96 is seen to support a ring-shaped rare earth magnet represented generally at 98. Magnet 98 is formed of the same magnetic material as magnet 76 and, as before, is configured outwardly presenting an inner sequence of generally arcuate inner radial boundary defined regions of magnetization of alternating polarity represented in FIG. 4 as the twelve regions 100a-100l. Such boundaries are represented by lines. As seen in FIG. 3, at magnetic regions 84d and 100d these radially adjacent corresponding outer radial boundary defined regions of magnetization and inner radial boundary defined regions of magnetization generally exhibit a common magnetic polarity. For example, in FIG. 3, region 84d is designated a south pole polarity while region 100d is designated with the same polarity. Inner ring magnet 98 provides an inner confronting magnetic surface represented generally at 102.

Figure 5:
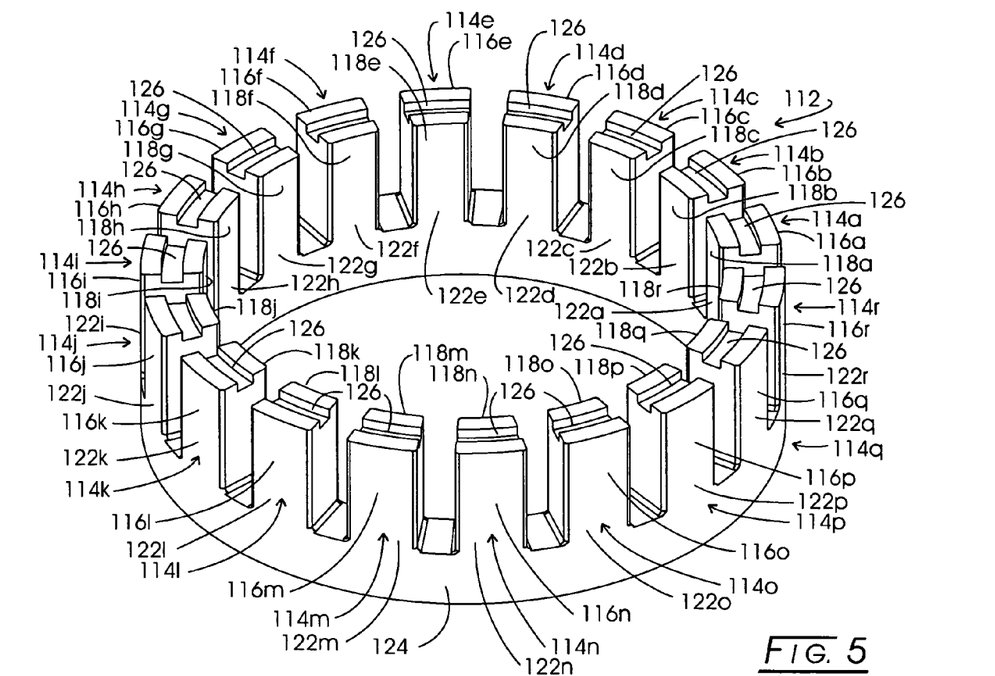
FIG. 5 is a perspective view of a core assembly employed with the motor of FIG. 1.

Disposed between the inner confronting magnetic surface 102 and outer confronting magnetic surface 82 is a stator core assembly represented generally at 110. Stator or core assembly 110 is provided as a "vertical" stator configured with a stator core assembly having a number of isotropic core components formed of pressure shaped processed soft ferromagnetic particles which are generally mutually insulatively associated. The core assembly is illustrated in perspective fashion in FIG. 5 and is represented generally at 112. Assembly 112 is configured with eighteen core components, each of which is disposed in parallel relationship with motor axis 28. The core components are generally identified in FIGS. 4 and 5 at 114a-114r. Core components 114a-114r are disposed along a circular locus symmetrically disposed about the motor axis 26. Each core component is configured having a flux interaction region with an radially outwardly facing outer flux interaction surface shown respectively at 116a-116r and identified without the alphabetical designators at 116 in FIG. 6. Looking to that figure, it may be seen that the outer flux interaction surface is coextensive with the height of outer magnet 76.

Figure 6:
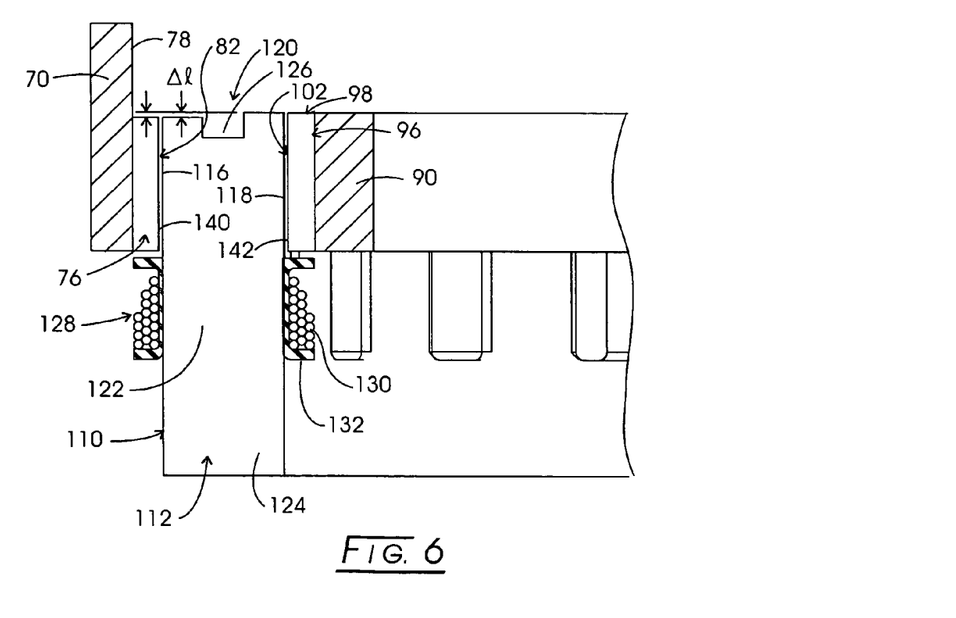
FIG. 6 is a partial sectional view of the motor of FIG. 1 illustrating a stator pole assembly and an enhanced inner working gap length.

Disposed oppositely from the outer flux interaction surfaces 116a-116r are radially inward facing inner flux interaction surfaces 118a-118r. This surface is indicated without an alphabetical designation in FIG. 6 at 118. Note that this surface 118 is coextensive with the inner confronting magnetic surface 102 of inner magnet 98. With the arrangement shown, the flux interaction region extends from a top region shown in general at 120 in FIG. 6 to a location aligned with the bottom edges of the inner and outer magnets 96 and 76. Below that region is a winding region shown in FIG. 5 at 122a-122r and in FIG. 6 at 122 without an alphabetical designator. The winding region 122 then extends to an integrally formed ring-shaped backiron region 124 interconnecting the core components 114a-114r in magnetic field exchange relationship. Within the top portions 120 of the core components 114a-114r there is formed an outwardly open channel or slot 126. For the more powerful motors as at 10, the stator core components as at 114a-114r are somewhat thick. Accordingly, the open slot or channel 26 is at a location of very little flux concentration. Accordingly, the slots as 126 cans be provided with the advantage of lessening the amount of particulate material utilized and thus lowering the cost of the stator core assembly. FIGS. 2 and 6 reveal that a field winding assembly represented generally at 128 extends about winding region 122 as designated at 122a-122r in FIG. 5. Assemblies as at 128 incorporate winding components as shown at 130 which are wound about an electrically insulative bobbin 132.

With the arrangement shown, as seen in FIGS. 2 and 6, for each core component, an outer working air gap 140 is established between the outer confronting surfaces as at 82 and outer flux interaction surfaces as at 116. Additionally, an inner working air gap 142 is established between flux interaction surface 118 and inner confronting magnetic surface 102 for each stator pole. Under ideal conditions, for each stator pole, the force at working air gap 140 would be equal to the force at working air gap 142 thus achieving a balance. As revealed at FIG. 4, each of the core components 114a-114r exhibits a generally keystone shape wherein the circumferential extent of the outer flux interaction surfaces 116a-116r is greater than the corresponding circumferential extent of the inner flux interaction surfaces 118a-118r. The amount of area at the inner working gap however, is increased under the precepts of the instant architecture by lengthening the surface areas at the inner gap 142. Looking in particular to FIG. 6, note that the surface area of the confronting components of working air gap 142 is higher by an amount Δl than the corresponding confronting surface area at working air gap 140. This arrangement promotes a parities in the forces at these two regions.

The field windings and associated control and drive circuitry of the motor 10 are configured for three-phase bipolar performance. Returning to FIG. 2, it may be observed that internally disposed and outside of the bearing arrangement is a circuit board 150 which is mounted over a plastic stand-off 152. The upper or top surface of the circuit board 150 is configured supporting three Hall effect commutational sensing devices, one of which is seen at 154 in spaced adjacency with a rotor carried sensible system comprised of a ring magnet 156 carrying regions of alternating magnetic polarity and supported by a downwardly extending support portion 158 integrally formed with the plastic rotor 60. Circuit board 150 is rotationally adjustable by virtue of its association with adjusting assembly represented generally at 160 which performs, for example with a pin 162. A locator pin 164 extending from a bore within the aluminum base 24 functions to align the stator pole assembly 110. Positioned on the bottom of circuit board 150 are power switching devices of a MOSFET variety. Two of the six such devices are represented at 166. Note that the components 166 are in abutting relationship with the top surface of the aluminum base 24. Thus, the base functions as a heat sink.

Without correction, a substantial detent torque will be present in connection with the motor 10 architecture. Looking again to FIG. 4, it may be seen that the outer working air gap 140 is located at a radius Ro from the motor axis. Similarly, the inner working gap 142 is located at a lesser radius Ri from that axis. Thus, a detent torque will involve the forces at the working gap interfaces and the two radii. It is desirable to promote a cancellation of these detent torques and the DG architecture facilitates the promoting of that mutual cogging or detent torque cancellation. This is carried out by mutually offsetting the inner and outer rotor magnet rings. In this regard, it is desirable to offset the mechanical detent curve between the inner and outer rings by 180° of detent torque. Typically, there are six detent torque cycles in one energized torque cycle. For instance, for 360° of electrical travel there typically will be six times that in mechanical detent torque cycles. Therefore 60° of electrical travel is typically 360° of detent torque. That being the case, the instant architecture offsets the rotor magnet rings by 30° of electrical torque. For this twelve pole rotor that offset is 5° of mechanical angle. Thus, the inside magnet ring 98 is offset by 5° from the outside magnet ring 76. In FIG. 3, that 5° is the arc between radii 170 and 172. In this regard, the arc α3 is 20.5° and the arc α4 is 15.5°. Note that this arrangement is reflected in the relative positioning of the machine screws 74a-74e and machine screws 94a-94e. With the arrangement at hand, the detent or cogging torque exhibited by motor 10 is reduced essentially by an order of magnitude.

Figure 7:
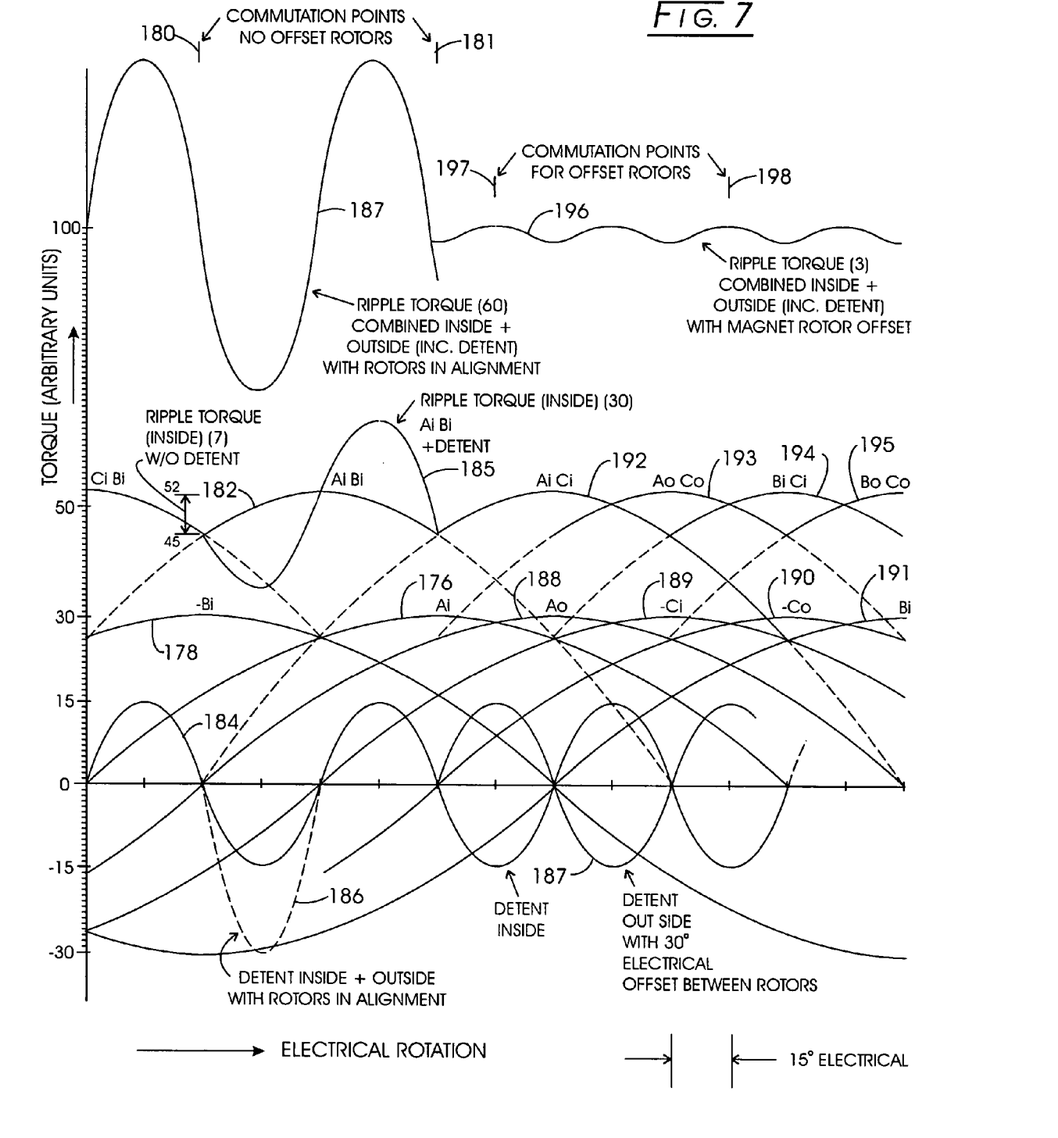
FIG. 7 is a partial plot of torque curves associated with the motor of FIG. 1.

Referring to FIG. 7, instructional torque curves for the motor 10 have been prepared. Motor 10 is a Y-wound bipolar driven device of three phases arbitrarily designated A, B and C. These phases also are associated with the inside working air gap and are thus designated Ai, Bi and Ci. For the outside working air gap the phases are designated Ao, Bo, and Co. For bipolar drive two phases will be excited, the initially designated one being considered a positive excitation and the second phase of an excited phase pair being considered a negative excitation. The phases of both the inner motor function and the outer motor function are excited simultaneously. In the interest of clarity, some assumptions have been made in producing the curves of FIG. 7. Note in this regard that the ordinate in the figure is divided into arbitrary units of torque extending from a zero unit position at the abscissa. All torque curves are assumed to be sinusoidal. It is assumed that the individual phase torque, i.e., phases A, B, or C has a peak magnitude of thirty arbitrary units. Additionally, a detent torque will typically be present and that peak value of torque is arbitrarily designated to be one-half of the excitation peak torques or 15 units. This is a realistic relationship, the summation value always being dependent upon the load or current level of excitation for the motor and therefore the magnitude of the energized phase torque. The abscissa shown in the figure is divided into 15° units of electrical travel and as the curves progress initially from left to right, the demonstration considers the inner and outer magnetic zones to be radially aligned. The right side of the curve set assumes the inner and outer rotor magnetic zones to be mutually offset by 30° of electrical movement which, as discussed above, amounts to 5° of angular offset. Next, it is assumed that the torque curves for both the inside and outside working air gaps have identical peak values and curvature and the same is assumed for the detent torque curves. This, again is for the purpose of developing a more clear description.

Looking to the curves, phase Ai at curve 176 proceeds from a zero value to a value of 30 torque units and then returns to a zero value. Note that there are twelve 15° divisions in that travel and thus it amounts to a total of 180°. Phase-Bi is shown at curve 178. Where no offset of the rotor magnetic regions is present, then the commutation points will be seen at the top of the figure at 180 and 181. The combined inner motor function then is designated as Ai, Bi as represented at curve 182. Curve 182 does not yet involve the associated detent torque phenomena. Under aligned conditions the inside detent torque having a peak value of 15 torque units as discussed above, is represented at curve 184. That curve continues from left to right in the figure. Without considering detent torques, the peak ripple torque for aligned combinations of Ai, Bi and Ci, and 45 units at the crossover of the two curves amounts to 7 torque units. Note that that the Ci, Bi and Ai, Bi peak values are 52 units. Under the earlier assumption, the corresponding Ao, Bo curve will coincide with curve 182. Thus, the peak torque of the motor with aligned rotor magnetics would be 104 units. The addition of detent torque to the Ai, Bi curve 182 is represented at curve 185. However, for the aligned magnetic condition the detent torque values also add or are multiplied by 2 as represented at the dashed curve 186. The summation curve for this combination then becomes substantially distorted as represented at curve 187 where the combined ripple and detent torques for both the inside and outside motor functions shows a peak-to-peak excursion of 60 torque units. Such performance is not desirable.

By offsetting the inner and outer magnetics by an angle of 180° of detent torque or 30° electrical travel, and assuming an inside and outside equal identity of the detent torques, the detent torques may be assumed to cancel. This is represented at outside detent torque curve 187. Note how it mutually cancels with inside detent torque curve 184. With the 30° electrical offset, phase Ao may be represented at curve 188. Phase-Ci may be represented at curve 189. Phase-Co may be represented at curve 190 and phase Bi may be represented at curve 191. When these offset curves are combined they appear as curves Ai, Ci at 192, Ao, Co at 193, Bi, Ci at 194 and Bo, Co at 195. From a ripple standpoint only, note that the ripple torque peaks are about 2 torque units as opposed to the 7 for the aligned magnetic condition. The detent torques mutually canceling, for example, the peak of the Ai, Ci curve 192 will be 52 and the Ao, Co curve 183 at that point will be 45 torque units, the combination totaling 97 torque units which is a minimum value of the combined summation. The summation curve for this condition is shown at curve 196 and the commutation points are shown at 197 and 198. Note that there is a peak-to-peak torque unit excursion of 3 units, representing a highly desirable and regular combined torque characteristic. The theoretical loss in energized torque is 3.4% due to the offset of the inner and outer magnets.

Figure 8:
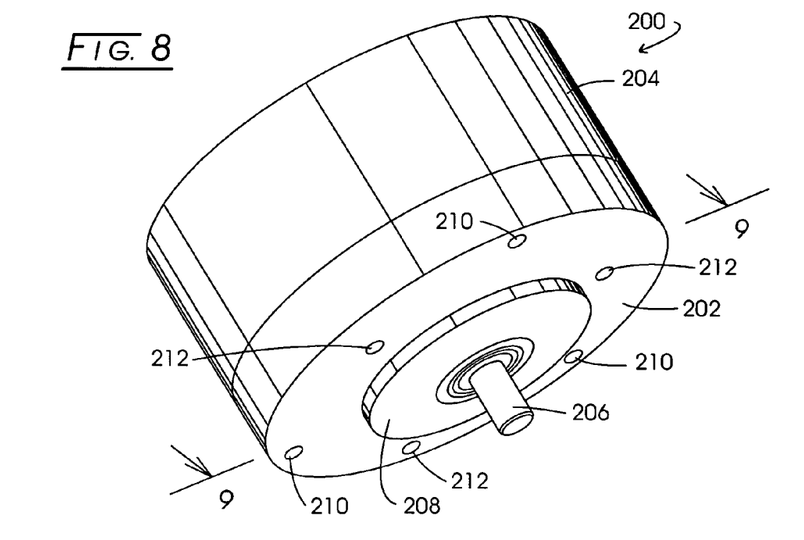
FIG. 8 is a perspective view of another motor employing the architecture of the invention.

Referring to FIG. 8, a motor 200 is revealed in perspective fashion. Motor 200 is one of lesser power than motor 10, being intended for use in such fields as appliances, tools, the automotive field and the like. The motors is formed with an aluminum base 202 to which is connected to a polymeric rotor housing 204 via an encapsulation process. The output shaft of the motor is represented at 206 extending from a flat cylindrical locating flange 208. Threaded bores are provided as at 210 which may be utilized for mounting the motor to a driven device. Additionally, particularly for development procedures, ejection holes as at 212 are provided to facilitate removal of the stator assembly.

Figure 9:
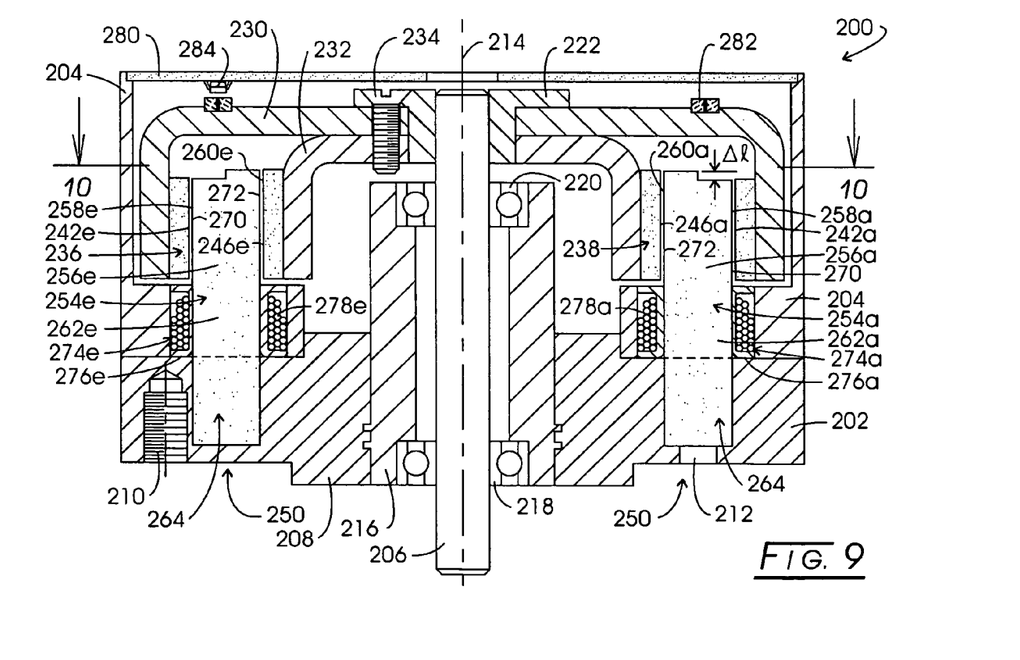
FIG. 9 is a sectional view taken through the plane 9-9 shown in FIG. 8.

Looking to FIG. 9, motor shaft 206 is seen symmetrically disposed about a motor axis 214 and is supported from an injection molded polymeric and generally cylindrically-shaped bearing housing 216. Housing 216 supports a forward bearing 218 and a rearward bearing 220, the bearings engaging shaft 206 for rotation. Shaft 206 extends rearwardly for connection with a rotor mounting hub 222. Hub 222, in turn, supports two steel, generally cup-shaped, rotor backiron components 230 and 232. Those components are connected together with mounting hub 222 by a machine screw 234. Rotor backiron component 230 supports a ring-shaped outer rotor magnet represented generally at 236 while the backiron component 232 supports a corresponding inner rotor magnet represented generally at 238. Magnets 236 and 238 are six pole in that they are formed of six generally arcuate radial boundary defined regions of magnetization of alternating polarity. Such regions are illustrated within lines boundary. Looking additionally to FIG. 10, these outer regions are revealed at 240a-240f. Such regions are illustrated within lines boundary. Regions 240a-240f present respective outer confronting magnetic surfaces 242a-242f. The figure further reveals that inner rotor magnet 238 is configured with inner radial boundary defined regions of magnetizations of alternating polarity shown at 244a-244f. Regions 244a-244f also are seen to present respective inner confronting magnetic surfaces 246a-246f. The outer magnetic confronting surfaces are represented at 242a and 242e in FIG. 9 and the corresponding inner confronting magnetic surfaces are represented at 246a and 246e in that figure.

Figure 10:
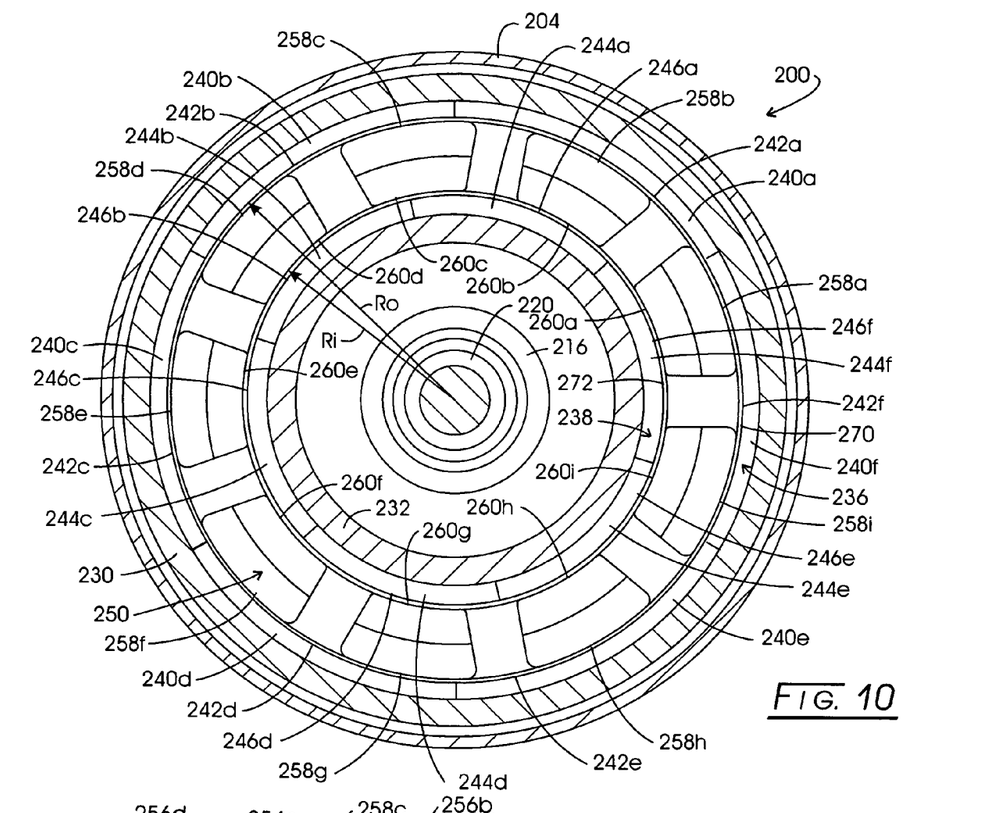
FIG. 10 is a sectional view taken through the plane 10-10 shown in FIG. 9.
Figure 11:
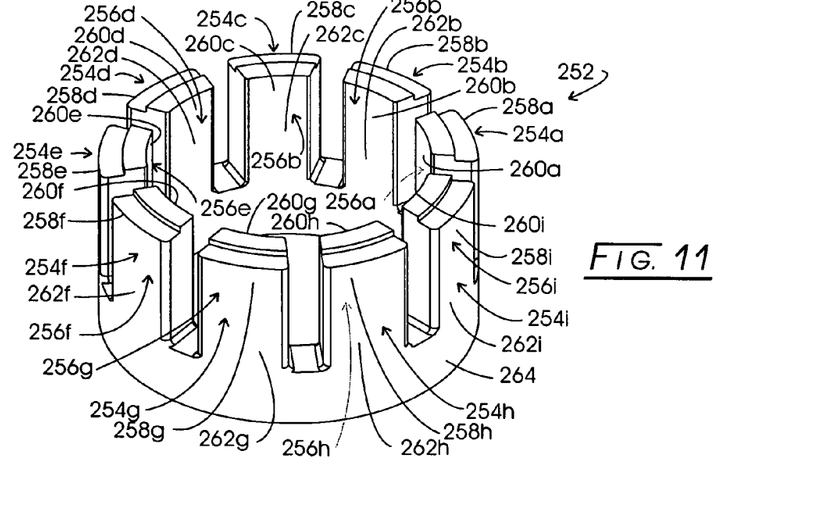
FIG. 11 is a perspective view of a stator core assembly employed with the motor of FIG. 8.

As represented in general in FIGS. 9 and 10, interposed intermediate the confronting surfaces 242 and 246 is a stator pole assembly represented in general at 250. Stator assembly 250 is configured with a stator core or core assembly represented in general at 252 in the perspective view of FIG. 11. Assembly 252 is formed of nine isotropic core components formed of pressure-shaped processed soft ferromagnetic particles which are generally mutually insulatively associated. The core components are represented at 254a-254i, are disposed in parallel relationship with motor axis 214 and are spaced apart along a circular locus symmetrically disposed about that axis. Each core component 254a-254i is formed with an upwardly disposed flux interaction region identified respectively at 256a-256i with a radially outwardly facing flux interaction surface 258a-258i and an oppositely disposed inner flux interaction surface shown respectively at 260a-260i.

Looking to FIG. 9, the outer flux interaction surfaces as at 258e extend coextensively with rotor magnet confronting surface 242e while the corresponding flux interaction surface 260e is seen to be coextensive with corresponding inner magnet confronting surface 246e. The same arrangement is seen in the figure with respect to outer confronting surface 242a and inner confronting surface 246a. From the flux interaction region 256a-256i, the core components extend to respective winding regions 262a-262i which, in turn, extend to a backiron region represented generally at 264.

As revealed in FIG. 10, the outer flux interaction surfaces 258a-258i are spaced from rotor outer confronting magnetic surfaces 242a-242f to define an outer working air gap 270 at a radius Ro from the motor axis. Similarly, inner flux interaction surfaces 260a-260i are spaced from inner confronting magnetic surfaces 246a-246f to define an inner working air gap 272 which is located at a radius Ri from the motor axis.

Returning to FIG. 9, two of the nine field winding assemblies are revealed in general at 274a and 274e. Disposed about respective winding regions 262a and 262e, the assemblies 274a and 274e are configured with electrically insulative bobbins 276a and 276e which retain winding components shown respectively at 278a and 278e. These winding components are configured for three-phase bipolar performance. Control for that performance is provided at a circuit board 280 mounted upon polymeric rotor housing 204. A commutational sensible system is provided with motor 200 which incorporates a sequence of magnetic regions within a magnetic ring 282. Magnetic transitions from the ring 282 are sensed by one or more Hall effect sensing devices, one of which is shown at 284. As in the case of motor 10, with motor 200 the length of the radially inwardly facing inner flux interaction surfaces of the core component is made longer or higher than the corresponding length of the outer radially outwardly facing flux interaction surfaces to promote a parity in the forces extant at working air gaps 270 and 272.

Where desired, the inner magnetic regions 244a-244f may be angularly offset with respect to the corresponding outer regions 240a-240f. For the nine stator pole six rotor poles architecture at hand, that offset will amount to 10 angular degrees. Such an offset can be observed in FIG. 10. As before, the offset promotes a mutual cancellation of detent torque at the working air gaps 270 and 272.

Since certain changes may be made in the above apparatus without departing from the scope of the invention herein involved, it is intended that all matter contained in the above description or shown in the accompanying drawings shall be interpreted as illustrative and not in a limiting sense.

The invention claimed is:

1. A d.c. motor having a motor axis comprising:

a stator core assembly having a number of isotropic core components formed of pressure shaped processed soft ferromagnetic particles which are generally mutually insulatively associated, each said core component being generally disposed in parallel relationship with said motor axis and in spaced apart relationship along a circular locus symmetrically disposed about the motor axis, each core component having a flux interaction region with a radially outwardly facing outer flux interaction surface of outer length generally parallel with said motor axis and a radially inwardly facing inner flux interaction surface of inner length greater than said outer length extending generally parallel with the motor axis, each said core component having a winding region extending in generally parallel relationship with the motor axis a field winding length from said flux interaction region to a backiron region interconnecting the core components in magnetic field exchange relationship;

a rotor having an outer sequence of a number of generally arcuate outer radial boundary defined regions of magnetization of alternating polarity with an outer confronting magnetic surface of height dimension generally parallel with the motor axis corresponding with a said stator core outer length, said outer confronting magnetic surface being generally coextensive with a said stator core outer flux interaction surface and spaced therefrom to define an outer working air gap, said rotor having an inner sequence of a number of generally arcuate inner radial boundary defined regions of magnetization of alternating polarity with an inner confronting magnetic surface of length dimension generally parallel with said motor axis corresponding with a said stator core inner length, said inner confronting magnetic surface being generally coextensive with a said stator inner flux interaction surface and spaced therefrom to define an inner working air gap, said rotor being rotatable about the motor axis; and a field winding assembly comprising winding components located around said core components and extending in electromagnetic flux coupling relationship about said winding region, said winding components being controllably electrically excitable for effecting driven rotation of said rotor about said motor axis.

2. The d.c. motor of claim 1 in which:

said stator core assembly inner flux interaction surface inner length is selected to promote a parity between forces at said inner working gap and said outer working gap.

3. The d.c. motor of claim 1 in which:

said stator core assembly inner flux interaction surface inner length is derived by extending the height of said inner flux interaction surface above said winding region above the corresponding height of said outer flux interaction surface.

4. The d.c. motor of claim 3 in which:

one or more of said core components of said stator core assembly extends to a top portion the radial center portion thereof being configured with an upwardly open channel dimensioned to provide a savings of said processed soft ferromagnetic particles while maintaining effective operational magnetic flux transfer.

5. The d.c. motor of claim 1 in which:

the radially adjacent corresponding outer radial boundary defined regions of magnetization and inner radial boundary defined regions of magnetization generally exhibit a common magnetic polarity; and each inner radial boundary is radially angularly offset from the corresponding outer radial boundary an amount effective to promote a mutual cancellation of detent torque at said outer working gap with detent torque at said inner working gap.

6. A d.c. motor having a motor axis, comprising:

a stator core assembly having a number of isotropic core components formed of pressure shaped processed soft ferromagnetic particles which are generally mutually insulatively associated, each said core component being generally disposed in parallel relationship with said motor axis and in spaced apart relationship along a circular locus symmetrically disposed about the motor axis, each core component having a flux interaction region with a radially outwardly facing outer flux interaction surface generally parallel with the motor axis and a radially inwardly facing inner flux interaction surface extending generally parallel with the motor axis, each core component having a winding region extending in generally parallel relationship with the motor axis a field winding length from said flux interaction region to a backiron region interconnecting the core components in magnetic field exchange relationship;

a rotor, rotatable about the motor axis, having an outer sequence of a number of generally arcuate outer radial boundary defined regions of magnetization of alternating polarity with an outer confronting magnetic surface generally coextensive with a said stator core outer flux interaction surface and spaced therefrom to define an outer working air gap, said rotor having an inner sequence of a number of generally arcuate inner radial boundary defined regions of magnetization of alternating polarity with an inner confronting magnetic surface generally coextensive with a said stator core inner flux interaction surface and spaced therefrom to define an inner working air gap, the radially adjacent corresponding outer radial boundary defined regions of magnetization and inner radial boundary defined regions of magnetization generally exhibit a common magnetic polarity, and each inner radial boundary being radially angularly offset from the corresponding outer radial boundary an amount effective to promote a mutual cancellation of detent torque at said outer working gap with detent torque at said inner working gap;

a field winding assembly comprising winding components located around said core components and extending in electromagnetic flux coupling relationship about said winding region;

a control circuit coupled with said field winding assembly and configured to effect the commutation angle based phase sequence excitation of said winding components to rotate the rotor about the motor axis; and a control circuit effects said excitation of said winding components at commutation angles corresponding with the radial angular offset of corresponding inner and outer radial boundaries defining magnetic regions.

7. The d.c. motor of claim 6 in which:

said control circuit effects said excitation at commutation angles generally an angular displacement of about one-half said radial angular offset.

8. A d.c. motor having a motor axis, comprising:

a stator core assembly having a number of isotropic core components formed of pressure shaped processed soft ferromagnetic particles which are generally mutually insulatively associated, each said core component being generally disposed in parallel relationship with said motor axis and in spaced apart relationship along a circular locus symmetrically disposed about the motor axis, each core component having a flux interaction region with a radially outwardly facing outer flux interaction surface generally parallel with the motor axis and a radially inwardly facing inner flux interaction surface extending generally parallel with the motor axis, each core component having a winding region extending in generally parallel relationship with the motor axis a field winding length from said flux interaction region to a backiron region interconnecting the core components in magnetic field exchange relationship;

a rotor, rotatable about the motor axis, having an outer sequence of a number of generally arcuate outer radial boundary defined regions of magnetization of alternating polarity with an outer confronting magnetic surface generally coextensive with a said stator core outer flux interaction surface and spaced therefrom to define an outer working air gap, said rotor having an inner sequence of a number of generally arcuate inner radial boundary defined regions of magnetization of alternating polarity with an inner confronting magnetic surface generally coextensive with a said stator core inner flux interaction surface and spaced therefrom to define an inner working air gap, the radially adjacent corresponding outer radial boundary defined regions of magnetization and inner radial boundary defined regions of magnetization generally exhibit a common magnetic polarity, and each inner radial boundary being radially angularly offset from the corresponding outer radial boundary an amount effective to promote a mutual cancellation of detent torque at said outer working gap with detent torque at said inner working gap;

a field winding assembly comprising winding components located around said core components and extending in electromagnetic flux coupling relationship about said winding region;

a control circuit coupled with said field winding assembly and configured to effect the commutation angle based phase sequence excitation of said winding components to rotate the rotor about the motor axis;

said field winding assembly is a three-phase configuration;

said number of core components is eighteen;

said number of each rotor inner and outer radial boundary defined regions is twelve; and the angular radial boundary offset is 5°.

* * * * *